US008195789B2

(12) United States Patent
Carter

(10) Patent No.: US 8,195,789 B2
(45) Date of Patent: Jun. 5, 2012

(54) SYSTEM, APPARATUS AND METHOD FOR CHARACTERIZING MESSAGES TO DISCOVER DEPENDENCIES OF SERVICES IN SERVICE-ORIENTED ARCHITECTURES

(75) Inventor: Frederick H. Carter, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1496 days.

(21) Appl. No.: 11/111,130

(22) Filed: Apr. 20, 2005

(65) Prior Publication Data

US 2006/0242292 A1 Oct. 26, 2006

(51) Int. Cl.
*G06F 15/173* (2006.01)
(52) U.S. Cl. .................. 709/224; 370/428; 713/171
(58) Field of Classification Search .................. 709/224
See application file for complete search history.

(56) References Cited

U.S. PATENT DOCUMENTS

| 5,991,399 | A * | 11/1999 | Graunke et al. ............. 380/279 |
| 7,237,112 | B1 * | 6/2007 | Ishiguro et al. ............. 713/169 |
| 2002/0059419 | A1 * | 5/2002 | Shinoda ........................ 709/224 |
| 2002/0116466 | A1 * | 8/2002 | Trevithick et al. ............ 709/206 |
| 2002/0184310 | A1 | 12/2002 | Traversat et al. |
| 2003/0097286 | A1 * | 5/2003 | Skeen ............................... 705/7 |
| 2003/0097564 | A1 * | 5/2003 | Tewari et al. ................. 713/171 |
| 2003/0115317 | A1 * | 6/2003 | Hickson et al. ............... 709/224 |
| 2004/0254945 | A1 | 12/2004 | Schmidt et al. |
| 2005/0204051 | A1 * | 9/2005 | Box et al. ..................... 709/230 |
| 2005/0228865 | A1 * | 10/2005 | Hirsch ........................... 709/206 |
| 2006/0005013 | A1 * | 1/2006 | Huitema et al. ............... 713/162 |
| 2006/0069717 | A1 * | 3/2006 | Mamou et al. ................ 709/203 |
| 2006/0095274 | A1 * | 5/2006 | Phillips et al. ................... 705/1 |
| 2006/0209868 | A1 * | 9/2006 | Callaghan ..................... 370/428 |
| 2008/0244319 | A1 * | 10/2008 | Nehab et al. .................... 714/38 |

OTHER PUBLICATIONS

Notification of Transmittal of International Search Report and Written Opinion for International Application No. PCT/US06/13876.

* cited by examiner

*Primary Examiner* — Firmin Backer
*Assistant Examiner* — Hamza Algibhah
(74) *Attorney, Agent, or Firm* — Kilpatrick Townsend & Stockton LLP

(57) ABSTRACT

A system, apparatus, computer readable medium and method are disclosed for identifying underlying services of transactions in a service-oriented architecture ("SOA")-based computer network. In one embodiment, a computer readable medium includes executable instructions to characterize messages communicating among services to form characterizations of the messages. Also included are executable instructions to determine dependencies using the characterizations of messages within a subset of the services. These dependencies can be represented as dependency links interconnecting the subset of the services that effectuate a transaction of interest. By identifying the dependency links, the underlying services in SOA-based networked computer system can advantageously be determined for managing the behavior of the subset of the services and other distributed services of the SOA-based networked computer system.

9 Claims, 7 Drawing Sheets

SYSTEM, APPARATUS AND METHOD FOR CHARACTERIZING MESSAGES TO DISCOVER DEPENDENCIES OF SERVICES IN SERVICE-ORIENTED ARCHITECTURES

BRIEF DESCRIPTION OF THE INVENTION

This invention relates generally to services and service-oriented architectures ("SOAs"). More particularly, this invention relates to autonomous agents that characterize messages exchanged between service requesters and providers, whereby characterizations for one or more of those messages determine dependency links among constituent services of a select transaction.

BACKGROUND OF THE INVENTION

A service-oriented architecture ("SOA")-based networked computer system implements heterogeneous computing devices and software programs to provide distributed services. Any of these services can accept requests from a client irrespective of programming languages, hardware platforms, and locations on a network. Also, the services, such as a web services, exchange messages using standardized communication protocols, such as SOAP (Simple Object Access Protocol). SOAP is a protocol specification that defines a uniform way of passing XML-encoded data and defines a way to invoke remote processing using HTTP as a common transport protocol (or another transport protocol) as the underlying communication protocol. By using SOAP or any like protocol, a service requestor and a service provider can communicate across different platforms and different programs, so long as their interfaces are determinable, such as in accordance with an interface contract. Further, service-oriented architectures implement services without regard to the specific tasks or transactions that those services perform. Accordingly, developers of SOA-based systems can reuse existing services to implement newer and more sophisticated transactions.

But while the service-oriented architecture provides flexibility to build systems using existing services, the monitoring, managing, and controlling of SOA-based systems and their transactions can be difficult since any one service can receive and transmit messages for any number of unspecified transactions. Consequently, a manager of an SOA-based system cannot readily identify the participants in a specific transaction, thereby hindering the manager's ability to perform, for example, root-cause failure analysis, performance analysis, impact analysis (i.e., how modification of a service affects any number of transactions), and other like system diagnostics.

One approach to identify the transactions to which a particular service belongs alters the messages to insert keys that have a primary function of tracking dependencies among a specific grouping of services. Typically, the same key is inserted in to each message used to perform the transaction. A drawback to this approach is that altering a message to include a key can cause it to be deemed suspect and then discarded in accordance with some network security policies. Another drawback to this approach is that some service providers can be located outside the scope of a system manager's sphere of authority (e.g., services external to an enterprise), and as such, those outside services might not be equipped to process such keys that otherwise should be removed prior to messages arrival. Consequently, external services might fail if they cannot process the keys.

In view of the foregoing, it would be desirable to provide a mechanism for enhancing the functionality of existing services. Ideally, the technique would provide enhanced functionality to effectively characterize and relate service messages so as to detect, report and manage transactions and services in an SOA-based networked computer system.

SUMMARY OF THE INVENTION

A system, apparatus, computer readable medium and method are disclosed for identifying underlying services of transactions in a service-oriented architecture ("SOA")-based computer network. In one embodiment, a computer readable medium includes executable instructions to characterize messages communicating among services to form characterizations of the messages and to determine dependencies within a subset of the services using the characterizations. In one embodiment, the executable instructions of the computer readable medium are configured to characterize data representing the contents of the messages to form a characterization value for a subset of the messages. Executable instructions also store the characterization values external to the messages for comparison against other characterization values of other messages. Advantageously, this identifies equivalent messages without altering the messages. In a specific embodiment, executable instructions are configured to determine the characterization value as, for example, a function of a number of unique messages flowing among the subset of services. In some cases, the executable instructions can characterize the data by condensing an arbitrary amount of data representing each message in the subset of the messages to a fixed amount of data representing the characterization value. Advantageously, the fixed amount reduces the computational overhead of identifying equivalent messages. Additional executable instructions can also adjust a size associated with the fixed amount of data to maintain a number of unique characterization values to attribute to a number of subsets of the messages. Note that in some embodiments, the executable instructions to condense the arbitrary amount of data further include executable instructions to perform a hash function. In various embodiments, the computer readable medium includes executable instructions to characterize data that represents the contents of other messages to form another characterization value for another subset of messages. Other executable instructions are configured to compare the characterization value against the other characterization value and to identify a match between the characterization value and the other characterization value. The match signifies that messages of the subset of messages and the other subset of messages are equivalent. In at least one embodiment, the executable instructions to determine dependencies further includes executable instructions to associate the characterization value and the other characterization value with a first service and a second service, respectively. Additional instructions link the first service to the second service to establish a dependency link. Further, the computer readable medium includes executable instructions to graphically represent the dependency link on a display of a graphical user interface ("GUI").

In another embodiment, a system is configured to identify underlying services of transactions in a service-oriented architecture ("SOA")-based computer network. The system includes a network of computing devices implementing a plurality of services exchanging messages to perform a transaction and a message observer module configured to compute characterization values for messages either entering each service or exiting each service, or both, for a subset of services. Also included is a dependency calculator module configured to receive the characterization values and to determine dependency links between services having an equivalent characterization value within the subset of services. The one or more dependency links can describe the cooperation of services that effectuate the transactions.

In yet another embodiment, a computer readable medium includes executable instructions to identify underlying services of transactions in a service-oriented architecture ("SOA")-based computer network. The computer readable medium includes executable instructions to manage services by using a user interface executing on a computer device coupled to the SOA-based computer network. Further, the computer readable medium includes executable instructions to accept a request to determine a first subset of services coupled via dependency links that are used to perform a first transaction and to display for the first transaction a first service coupled via at least one dependency link to a second service. Executable instructions can also be configured to accept a request to modify a property of the at least one dependency link to modify performance of the first transaction. By modifying the property, one can manage operation of the SOA-based computer network.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1A:
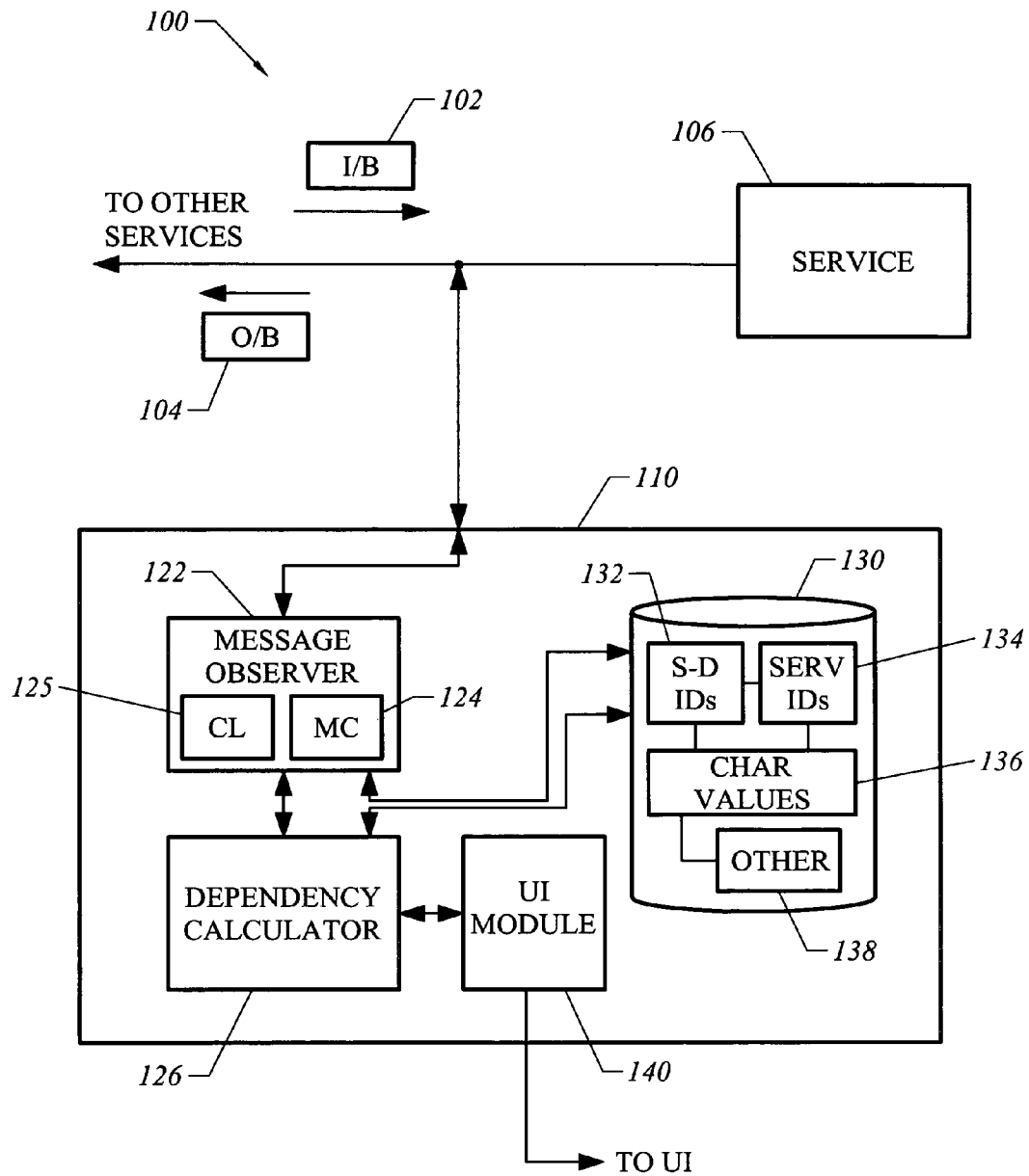
FIG. 1A is a block diagram illustrating an apparatus configured to discover dependencies among services in a service-oriented architecture ("SOAs")-based networked computer system in accordance with an embodiment of the invention.

FIG. 1A is a block diagram 100 illustrating an apparatus 110 configured to discover dependencies among services in a service-oriented architecture ("SOAs")-based networked computer system in accordance with an embodiment of the invention. Apparatus 110 includes a message observer 122 and a dependency calculator 126, each or both of which can be coupled to a repository 130. In various embodiments, apparatus 110 resides at or near service 106 regardless of whether that service is a source or a destination of messages. Generally, message observer 122 is configured to compute characterization values for messages either entering service 106 or exiting service 106, or both, with respect to a subset of services within the SOA-based networked system. Dependency calculator 126 is configured to receive the characterization values and to determine dependency links between services having an equivalent characterization value. Dependency links describe the cooperation of services that effectuate a transaction of interest. Normally, determining the effects of modifying an individual service on a vast number of transactions is difficult to discern without understanding how that individual service cooperates with different combinations of services that support those transactions. As such, apparatus 110 can advantageously identify the underlying services, such as service 106, for transactions in an SOA-based networked computer system. This facilitates the monitoring and managing of the transactions implementing distributed services within the SOA-based networked computer system.

Apparatus 110 intercepts or at least inspects messages, such as inbound ("I/B") message 102 and outbound ("O/B") message 104, that are exchanged with service 106. Messages 102 and 104 enable service 106 to interact via a computer network with other services (not shown) and with a client computing device (not shown) that is requesting the transaction that invokes service 106. The functionalities of one or more services, including service 106, collectively perform a higher-level activity. To illustrate, consider that service 106 is a service used by a customer to purchase a product. Service 106 can be an "order processing" service, a "credit checking" service, a "bill creation" service, or a "product shipping" service, all of which are used to at least perform the overarching transaction of "purchasing a product." Services, as used herein, are elements of a service-oriented architecture ("SOA") and are modules of executable instructions that generally operate irrespective of the underlying computer architectures and operating systems used to provide the services. These modules can be shared, reused and combined to create composite applications in a SOA-based networked computer system to expeditiously create sophisticated business transactions.

Message observer 122 receives messages 102 and 104 (or copies thereof) and characterizes those messages as they traverse a computer network between service 106 and other services. A message characterizer ("MC") 124 is disposed within message observer 122 is configured to characterize the messages in terms of, for example, the content of those messages. Characterizations of messages enable apparatus 100 to distinguish messages from each other without inserting an identifier into a message. Consequently, messages need not be altered to include a key to uniquely identify a subset of messages as being associated with a specific service and/or transaction. This is advantageous because many computer networks implement security policies that frequently reject messages that are altered during transmission between services. Thus, apparatus 110 can operate in secure computer networks to identify messages for discovering dependency links, according to at least one embodiment of the present invention.

In operation, message characterizer 124 examines the contents of a message and then computes a characterization value that is indicative of the relatively distinctive qualities of its contents, as compared to other messages having differing contents. A characterization value is indicative of data that represents the unique contents of one or more similar messages and is used to distinguish those one or more similar messages from other different messages. In some instances, message characterizer 124 can examine one or more portions of a message, such as the contents of the message headers, message bodies, and the like, to establish a characterization value. So long as the contents of messages 102 and 104 differ from each other, then different characterization values derived therefrom are sufficient to distinguish one message from another. And when the contents for each of messages 102 and 104 are the same, then equivalent characterization values derived therefrom can be used to identify those or other similar messages.

In a specific embodiment, message characterizer 124 is configured to condense messages 102 and 104 of any arbitrary length (i.e., any arbitrary amount of bits representing strings of characters) into a fixed amount of data that represents the characterization values for each message. Condensing the arbitrary amounts of data into fixed amounts advantageously reduces the computational overhead required to identify equivalent messages, among other things, when determining dependency links. By representing characterization values as a smaller, fixed amount of data, computational resources and time are preserved that otherwise would be consumed to match arbitrary amounts of data against other arbitrary amounts of data when determining whether two messages are equivalent. In accordance with one embodiment, the size of each characterization value is adjustable to maintain a number of unique characterization values for attribution to a number of different messages that can coexist during operation of an SOA-based networked computer system. For example, a number of bits for the fixed amount of data can adaptively change if additional transactions implement the underlying services or if the number of requests for these services, such as service 106, increases. Alternatively, the size of the characterization can change as the size of the messages increases (as opposed to the quantity). In both examples, the volume of messages will increase, thereby requiring more bits to uniquely identify messages. As such, the size of a characterization value can be a function of the total number of unique messages flowing among the services throughout the SOA-based networked computer system, according to at least one embodiment.

Message observer 122 is also configured to analyze and describe other aspects associated with the communication of messages 102 and 104. Message observer 122 analyzes the messages to form an association between the characterization value for each message and a service identifier that identifies service 106. Further, message observer 122 analyzes each message to determine whether the message is either an inbound message 102 or an outbound message 104. If the message is inbound to service 106, then message observer 122 indicates service 106 is a destination for the message by forming an association between a source-destination indicator specifying it is a "destination" and the service identifier for service 106. Similarly, if the message is outbound from service 106, then message observer 122 indicates that service 106 is a source of the message and forms an association between a source-destination indicator specifying it is a "source" and service 106.

In a specific embodiment, message observer 122 includes a causal linker ("CL") 125 to at least contribute to the above-described determination as to whether a message is either an inbound message 102 or an outbound message 104. While apparatus 110 uses message characterizer 124 to establish dependency links between services, apparatus 110 can use causal linker 125 to link two or more dependency links passing through a particular service, such as service 106. Causality is based on the impact of a message traveling over one dependency link to cause service 106 to generate another message that travels over another dependency link. In various embodiments, causal linker 125 can examine both messages and other information provided by the computing environment in which the causal linker is operating to extract other information that can be used to establish a "context" in which messages are exchanged with service 106. The context can be used to either enhance the ability of characterization values to identify equivalent messages or confirm that a characterization value is sufficient to identify like messages. Specifically, a context of a message generally includes an association that links an incoming message to an outgoing message with respect to a specific service. Consequently, message observer 122 and repository 130 can link messages having different characterization values so long as those messages are associated with a common service. These linked messages help form a chain of two or more dependency links, according to at least one embodiment.

In a specific embodiment, causal linker 125 is configured to extract contextual information from messages and to provide that contextual information to repository 130 as "other" information 138. Message observer 122 and repository 130 forms for each message an association between the contextual information and a characterization value and a source-destination indicator. Notably, the contextual information describes aspects of the processing environment in which inbound message 102 invokes a response by service 106 to generate outbound message 104. Contextual information for a message can be composed of, but not limited to, one or more of the following: the data representing the message being processed; information about the message as well as processing context, such as the name of the transaction; the time the message enters and/or exits at apparatus 110 (e.g., as defined by a timestamp); the identity of the user invoking the transaction; one or more fields in the message; and any other like information that describes the environs in which the messages are processed. Again, this information can be stored in repository 130 as "other" information 138.

Message observer 122 is coupled to repository 130 to at least: store source-destination indicators as source-destination indicators ("S-D IDs") 132, store service identifiers as service identifiers ("SERV IDs") 134 and store characterization values as characterization values ("CHAR VALUES") 136. Repository 130 also maintains relationships among those stored values as described above. Consider that for each message and service, repository 130 maintains a first association linking a characterization value of the message to the service. Also, repository 130 maintains a second association that links the service to a source-destination indicator for that message, whereby the source-destination indicator specifies whether that service is either a source or a destination for messages having that characterization value. Apparatus 110 uses these associations to form at least one dependency link with service 106.

Dependency calculator 126 is configured to receive with each characterization value 136, a corresponding source-destination indicator 132 and a corresponding service identifier 134. Source-destination indicator 132 indicates whether an associated message having characterization value 136 is destined to or is being sourced from the service identified by service identifier 134. With these, dependency calculator 126 determines at least one dependency link between services, such as between service 106 and another service that is not shown. Dependency calculator 126 is also configured to use the associations among the contextual information, characterization values and source-destination indicators to establish causal relationships between messages traversing two or more dependency links. For example, dependency calculator 126 uses the contextual information stored as "other" information 138 to determine a causal relationship between inbound message 102 and outbound message 104 with respect to service 106. To illustrate, consider that a service A (not shown) sends an inbound message 102 to service 106, then service 106 sends outbound message 104 to invoke another service, such as a service B (not shown), to satisfy the request. Service B then responds by sending a message as inbound message 102 back to service 106, which in turn responds by sending a message as outbound message 104 back to service A to thereby complete at least a part of a transaction using those three services. As the content for all messages 102 and 104 interacting with service 106 are generally different, message characterizer 124 determines different characterization for those messages. Given the context in which the messages are exchanged among service A, service B and service 106, dependency calculator 126 can establish a causal link that connects a dependency link between service A and service 106 to another dependency link between service B and service 106. In one embodiment, dependency calculator 126 uses the context to link both dependency links to form a dependency chain between service A and service B. So while dependency calculator 126 uses equivalent characterization values to link the two ends of a message's journey between two services to form a dependency link, it also uses contextual information to link messages passing through a common service based upon causality to link at least two dependency links.

Figure 1B:
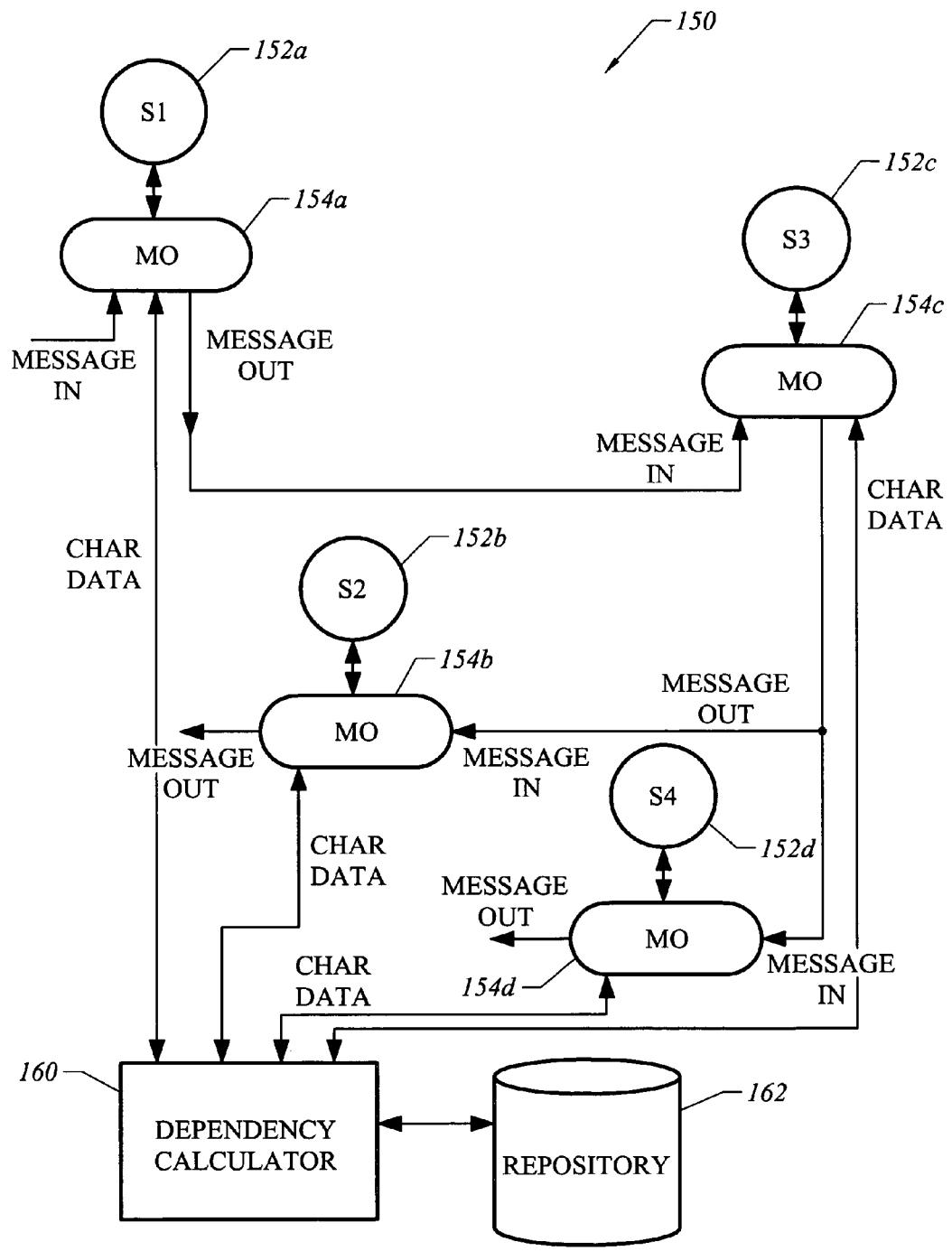
FIG. 1B is a block diagram illustrating a system of message observers distributed within a SOA-based computer system for discovering dependencies in accordance with an embodiment of the invention.

FIG. 1B is a block diagram illustrating a system of message observers distributed within an SOA-based networked computer system, in accordance with an embodiment of the invention. Message observers ("MO") 154a to 154d are coupled to services 152a to 152d, respectively, to observe messages being exchanged among those services. Then, message observers 154a to 154d communicate characterization values, among other things, to a common dependency calculator 160 and repository 162, both of which have equivalent structures and/or functionalities of dependency calculator 126 (FIG. 1A) and repository 130, respectively. In this example, services 152a to 152d exchange messages in a collaborative effort to perform an overarching transaction. One or more of these services can be located anywhere in SOA-based networked computer system 150, such as in different subnetworks that each communicates via the Internet, a wide area network ("WAN"), and/or a local area network ("LAN"). In this example, a first service ("S1") 152a receives a message (e.g., via "message in" port), performs its service function and then sends a message to a next service ("S3") 152c (e.g., via "message out" port) to continue performance of the transaction. Next service 152c then sends the same message (i.e., the same message content) to both services ("S2") 152b and ("S4") 152d to further perform (and/or complete) the transaction. In a specific embodiment, service 106 (FIG. 1A) can be any of services 152a to 152d. Each of message observers ("MO") 154a to 154d operates to send characterization data ("CHAR DATA") to common dependency calculator 160 and repository 162. For each message, CHAR DATA includes a characterization value, a corresponding source-destination indicator and a corresponding service identifier. Common dependency calculator 160 uses this CHAR DATA to form dependency links in a manner similar to dependency calculator 126 (FIG. 1).

Referring back to FIG. 1A to illustrate operation of dependency calculator 126, consider that message observer 122 has examined a first message with the attendant information being stored in repository 130, the attendant information including a first characterization value. As an example, consider that the first message is exiting service 106. Next, consider that another message observer (not shown) is similar in structure and/or functionality to that of message observer 122, but is disposed at or near another service (not shown). Also consider that the other message observer examines a second message entering the other service to compute a second characterization value. The other message observer operates to characterize the data representing the contents of the second message to compute a second characterization value as another characterization value. The second characterization value is composed of a fixed amount of data bits that uniquely identifies similar messages. Dependency calculator 126 compares the first characterization value against the second characterization value, and if there is a match, the match signifies that messages are equivalent. Note that both service 106 and the other service are within the subset of services constituting a transaction.

Dependency calculator 126 then forms a dependency link between service 106 and the other service. For example, consider that for a particular message, dependency calculator 126 designates service 106 as an originating portion of the dependency link if a first source-destination indicator identifies service 106 as a source of the message. Further consider that dependency calculator 126 designates the other service as a terminating portion of the dependency link if a second source-destination indicator identifies the second service as a destination of the message having an equivalent characterization value. Again, note that forming dependency links according to various embodiments can advantageously identify the underlying services, such as service 106, of transactions in an SOA-based networked computer system. Being able to discern those underlying services can normally be difficult and can consume resources unnecessarily.

Apparatus 110 optionally includes a user interface ("UI") module 140, which is configured to provide data representing one or more dependency links for displaying those dependency links on a display of a graphical user interface ("GUI"), for example. By displaying the dependency links between services, a system manager can readily determine which services constitute which transactions, thereby enabling the manager to expeditiously manage and modify the behavior of transactions. This facilitates proper operation of the SOA-based computer network.

Note that the term service, as used in some embodiments, can be described as, but not limited to, being loosely coupled and coarse-grained. Loosely coupled generally denotes relatively few dependencies between logic in services (i.e., heterogeneous computing device hardware and software platforms) and the message data upon which the logic operates. Coarse-grained generally refers to the ability of a service to performs its function and return its results in a single call (or very few calls). In one embodiment, messages 102 and 104 can employ a common communications protocol, such as SOAP ("Simple Object Access Protocol") to pass XML-encoded data, or any other suitable communications protocol. In a specific embodiment, service 106 is a web service communicatively coupled to a web service client 102 in a web service architecture. The term transaction does not imply a restriction to only commercial activity, but rather this term should be understood to denote any process that can be implemented using service 106. In one embodiment, apparatus 110 can be configured can be substituted for correlation keys to correlate messages as described in U.S. patent application Ser. No. 10/850,132 filed on May 19, 2004, titled "Apparatus and Method for Web Service Message Correlation," which is incorporated by reference in its entirety, for all purposes.

Figure 2:
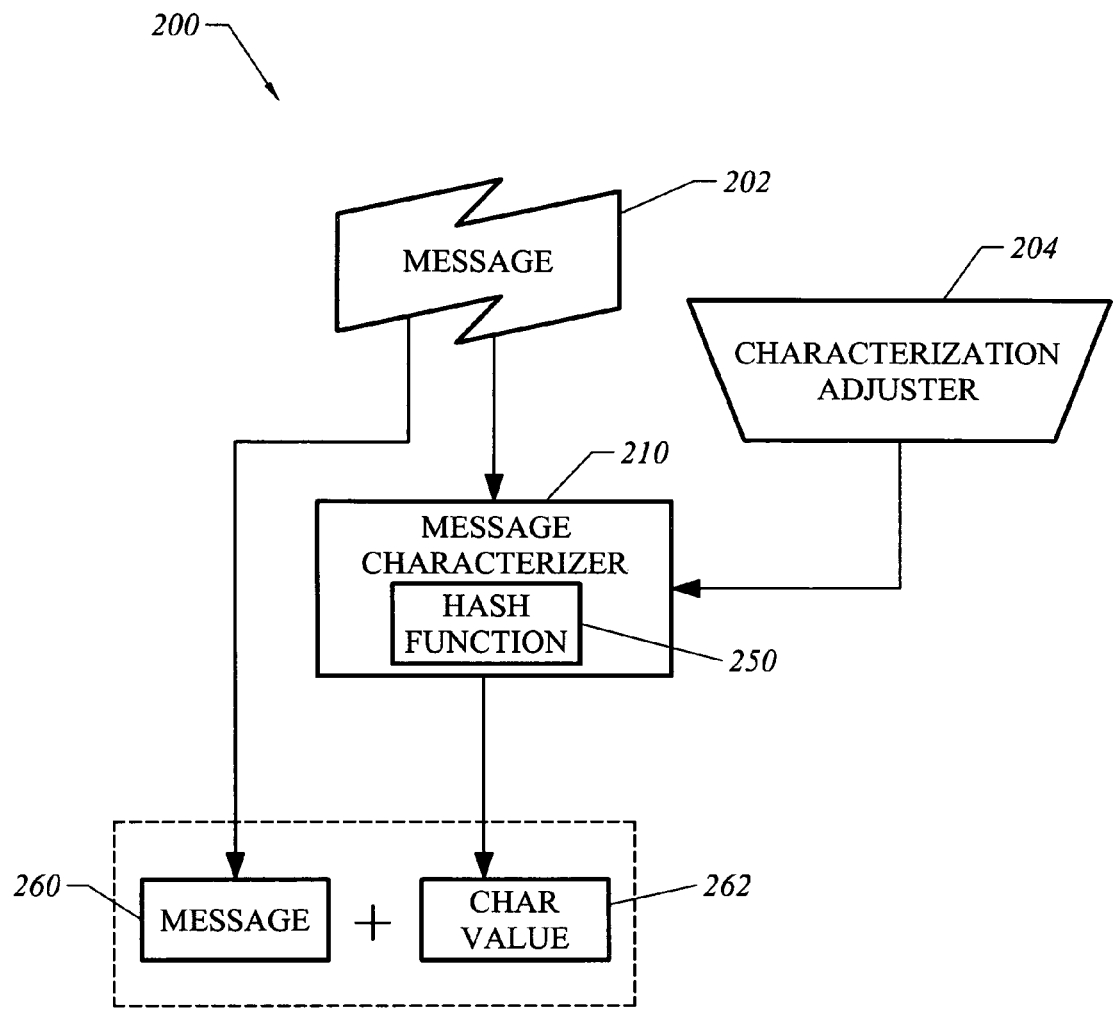
FIG. 2 is a block diagram illustrating a message characterizer in accordance with an embodiment of the present invention.

FIG. 2 is a block diagram 200 illustrating a message characterizer in accordance with one embodiment of the present invention. In this example, message characterizer 210 includes a hash function 250 to compute characterization values ("CHAR VALUE") 262. Message characterizer 210, which operates as a hash function, takes a message 202 as an input and transforms that message into a characterization value 262 having a fixed-length output referred to as a message digest. The message digest is a fixed-size set of bits that serves as a unique "digital fingerprint" for the original message. A suitable hash function for implementing message characterizer 210 is the MD-5 hash function, which is described in Request for Comments 1321 and maintained by MIT Laboratory for Computer Science and RSA Data Security, Inc. But note that message characterizer 210 need not implement public and private keys and other message authenticating protocols to condense the arbitrary amount of data. Consequently, the computational overhead of performing message characterization of various embodiments of the present invention is less than that required to authenticate a message using sophisticated algorithms. In one embodiment, optional characterization adjuster 204 is configured to program hash function 250 to generate a fixed amount of bits for representing each of the characterization values. The programmable hash function generator is configured to adjust the fixed amount of bits as a function of, for example, a number of total messages. The resulting fixed data amount is optimal in that it enables unique identification of messages, but also uses a minimal amount of computational resources to process characterization values. Message 260 and characterization value 262 can then pass information to the dependency calculator. In at least one embodiment, characterization adjuster 204 dynamically adjusts the characterization value based on any number of factors, including, but not limited to, the size of the messages, the quantity of messages, the construction of the messages, etc. In one embodiment, characterization adjuster 204 selects which one of a number of algorithms is used to compute the hash function, without necessarily changing the number of bits.

Figure 3:
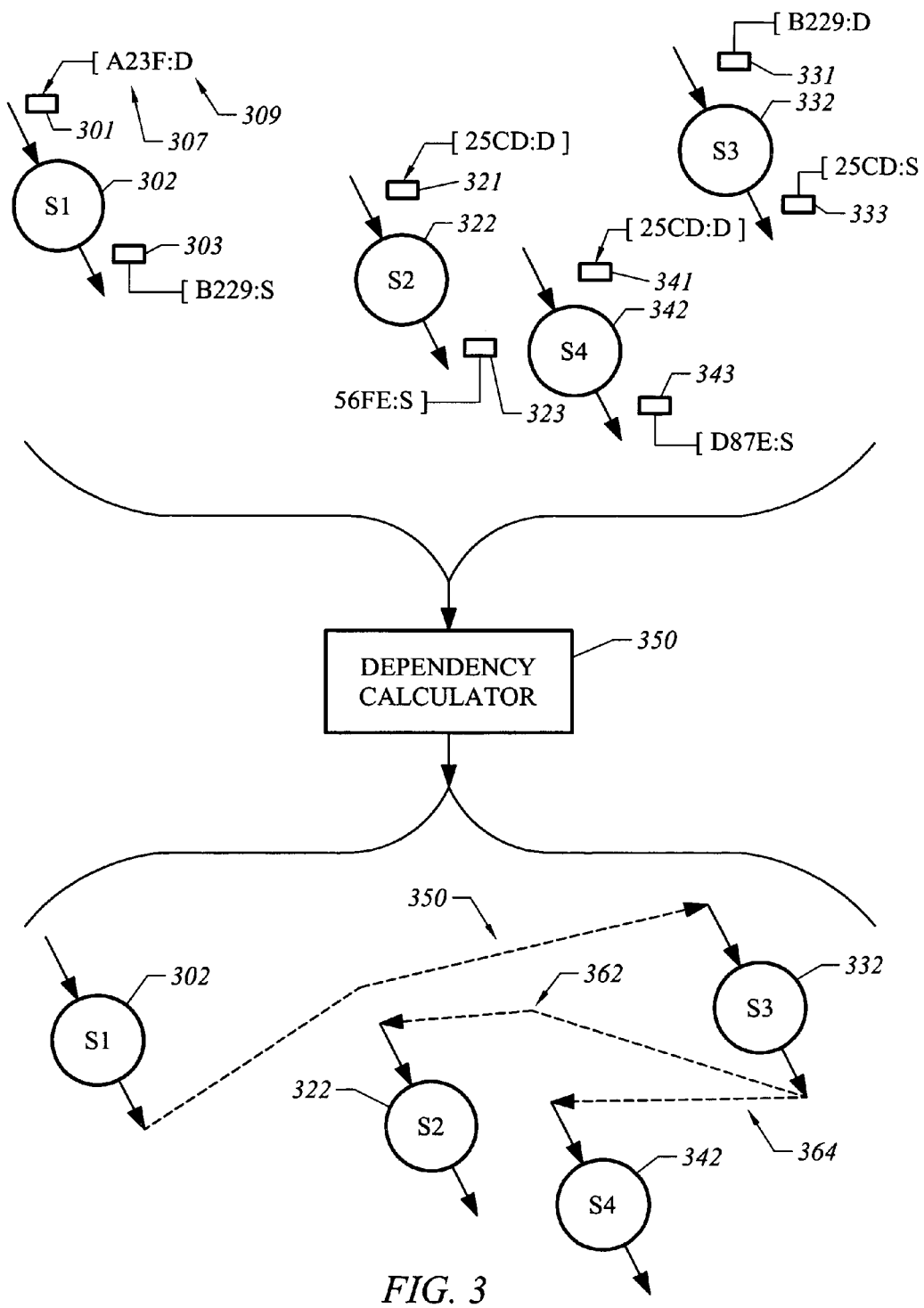
FIG. 3 depicts the operation of a dependency calculator, according to one embodiment of the present invention.

FIG. 3 depicts the operation of a dependency calculator, according to one embodiment of the present invention. First, consider that a repository stores the following service identifiers "s1, " "s2," "3 " and "s4 " for representing service ("1") 302, service ("2 ") 322, service ("3 ") 332 and service ("4 ") 342, respectively. Each of these services is associated with messages having a characterization value 307 (e.g., as a four digit hexadecimal number) and a source-destination indicator 309 of either an "S" ("source" of message) or a "D" ("destination for message). For example, incoming message 301 is characterized to have a characterization value of A23F and a source-destination indicator of "D," and outgoing message 303 is characterized to have a characterization value of B229 and a source-destination indicator of "S." Similarly, incoming messages 321, 331 and 341 are characterized to have respective characterization values of 25CD, B229, and 25CD and source-destination indicators of "D," "D," and "D," whereas outgoing messages 323, 333 and 343 are characterized to have respective characterization values of 56FE, 25CD, and D87E and source-destination indicators of "S," "S," and "S."

Dependency calculator 350 receives the above-described information and generates dependency links. First, dependency calculator 350 matches messages having an equivalent characterization value of B229, and then it forms dependency link 360 extending from service ("1 ") 302 to service ("3 ") 332. Note that service ("1 ") 302 is the source of messages having equivalent characterization value of B229 and service ("3 ") 332 is the destination. In a similar manner, dependency calculator 350 forms parallel dependency links 362 and 364. Thus, if service ("1 ") 302, service ("2 ") 322, service ("3 ") 332 and service ("4 ") 342, represent an "order processing" service, a "credit checking" service, a "bill creation" service, and a "product shipping" service, respectively, then the dependencies of the underlying services to perform the transaction "purchase a product" have been discovered. In one embodiment, dependency calculator 350 forms a first causal link from dependency link 360 to dependency link 362 and a second causal link from dependency link 360 to dependency link 364, the causal links each being associated with service ("S3 ") 332. In determining the causal links, dependency calculator 350 evaluates the context in which messages travel over these dependency links. The context can be described by contextual information associated with each message. For example, consider that messages entering service ("S3 ") 332 have the same (or nearly the same) time stamp as those messages exiting that service. Dependency calculator operates to preclude less temporally relevant messages from being considered in the determining of causal links (i.e., it considers only those messages that are temporally relevant in determining causality). The contextual information can also include a transaction identifier that specifies a unique transaction as "purchase a product" and a user identifier (e.g., as network address). In forming a causal link between dependency link 360 and dependency links 362 and 364, dependency calculator forms causal relationships for messages exiting and entering service ("S3 ") 332, so long as those messages have the same transaction identifier, the same user identifier and the same time stamp, regardless of differing characterization values. Note that different aspects or types of contextual information can be used to establish the above-described causal links.

Figure 4:
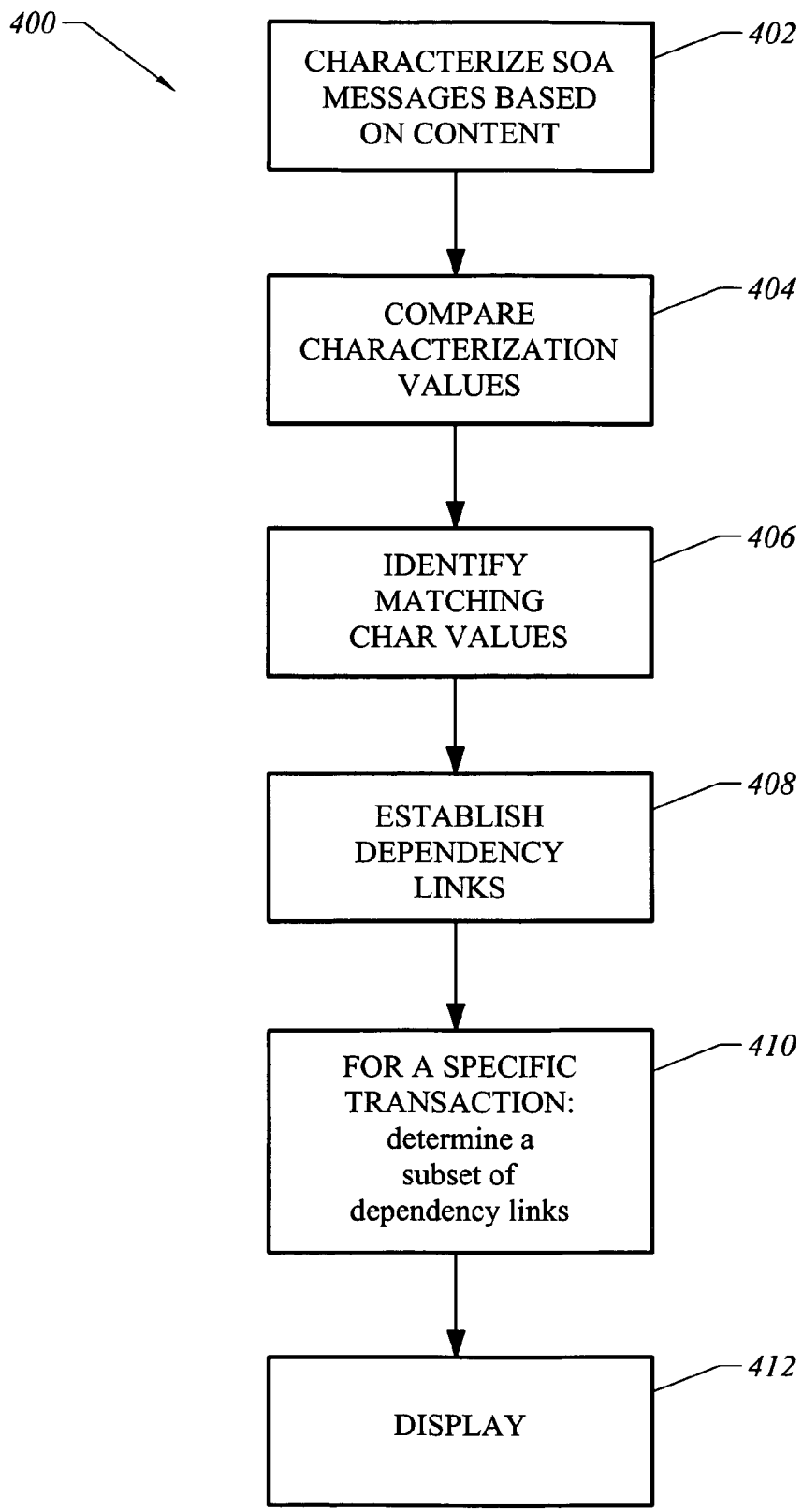
FIG. 4 is a flow diagram describing a method for discovering dependencies in a SOA-based networked computer system in accordance with an embodiment of the present invention.

FIG. 4 is a flow diagram describing a method for discovering dependencies in a SOA-based networked computer system in accordance with an embodiment of the present invention. At 402, messages traversing through the SOA-based networked computer system are characterized, for example, in terms of the content of a message. The characterizations of messages are characterization values. Those characterization values are compared at 404. Any matching characterization values or message digests are identified at 406. Each service within the SOA-based networked computer system that is associated with a matched characterization value can be used to establish dependency links with other services at 408. At 410, a subset of dependency links among services that underlie a specific transaction are determined. Then, at 412, the dependency links from the subset are displayed on a graphical user interface.

Figure 5:
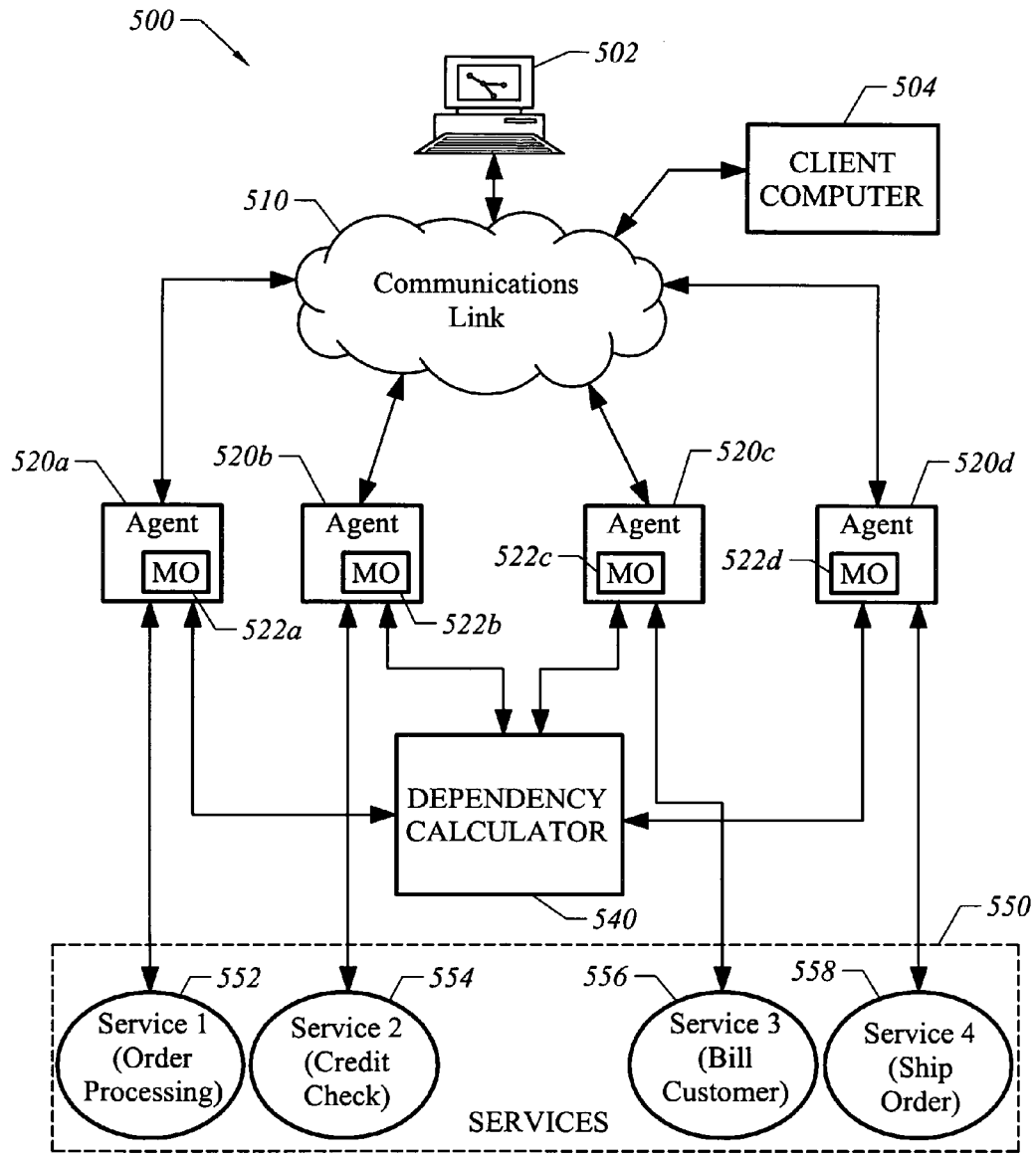
FIG. 5 is a diagram of a system for discovering dependencies in a SOA-based networked computer system in accordance with an embodiment of the present invention.

FIG. 5 is a diagram of a system for discovering dependencies in an SOA-based networked computer system in accordance with an embodiment of the present invention. In this example, the SOA-based networked computer in which system 500 resides is a web service architecture. Consider that a user initiates a transaction at a client computer device 504, such as "purchasing a product." This transaction requires the functionalities of the underlying web services, service ("1 ") 552, service ("2 ") 554, service ("3 ") 556 and service ("4 ") 558 to implement an order processing web service, a credit check web service, a bill customer web service, and a ship order web service, respectively. Web services 550 perform individual web services corresponding to their individual names. Although web services 550 can send and receive XML messages in the SOAP format, other protocols can be implemented (e.g., non-SOAP XML, etc.). In some embodiments, services of web services 550 can be consolidated on a single host computing device. Or, those services can be distributed over any number of computing devices in a network.

In this example, messages being exchanged between client computer 504 and services 550 pass through agents 520a to 520*d*, each of which are associated with respective services 552 to 558. Messages pass via communications link 510 (e.g., a computer network) to communicate with services 550. Agents 520*a* to 520*d* each can be configured to examine and to modify the contents of messages, to reroute messages, and to analyze the context of messages, among other things. Agents 520*a* to 520*d* can also change values or states of a variable within the message, by executing instructions called actions. An action instructs any of agents 520*a* to 520*d* to perform a unit of processing as either a service or a transaction, or both. A suitable agent for implementing agents 520*a* to 520*d*, according to a specific embodiment of the present invention, is described in U.S. patent application Ser. No. 10/201,617 filed on Jul. 22, 2002, titled "Apparatus and Method for Content and Context Processing of Web Service Traffic," which is incorporated by reference in its entirety, for all purposes. In a specific embodiment, each of agents 520*a* to 520*d* includes a corresponding message observers ("MO") 522*a* to 522*d* for characterizing messages as an action. Each message observer 522*a* to 522*d* has an equivalent structure and/or functionality of the message observers described elsewhere. While the functionalities of message observers 522*a* to 522*d* are distributed, the functionality of dependency calculator 540 and a repository (not shown) can be consolidated at a common location, as shown in this example. Dependency calculator 540 of FIG. 5 has an equivalent structure and/or functionality to that described elsewhere. With message observers 522*a* to 522*d* and dependency calculator 540 cooperating to establish dependency links, a system manager can use computing device 502 to view dependency links and to modify the operational characteristics of those links as well as the associated services when managing the performance of an SOA-based networked computer system.

Figure 6:
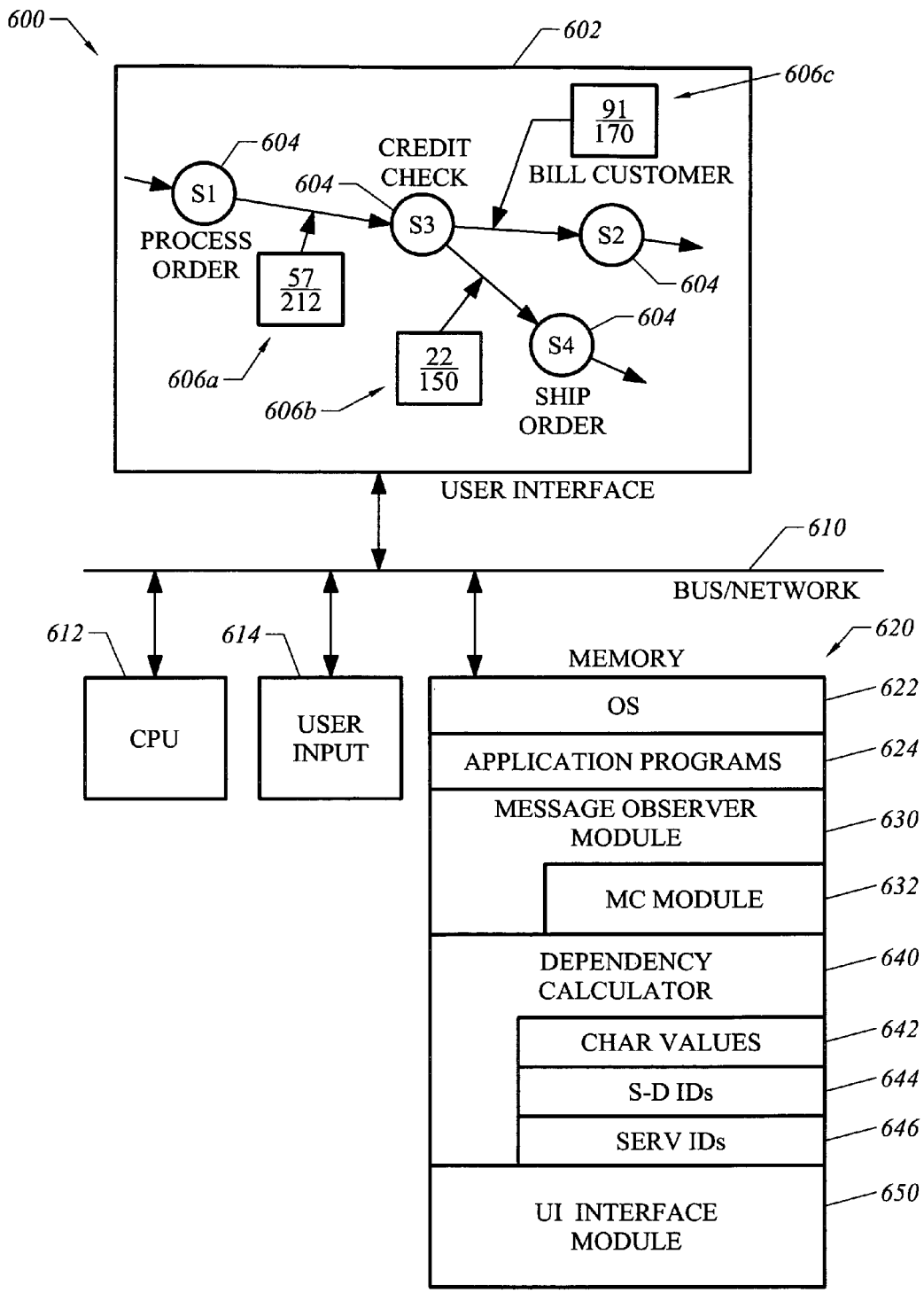
FIG. 6 depicts a computer device implementing a user interface to modify the operational characteristics of dependency links, according to an embodiment of the present invention.

FIG. 6 depicts a computer device implementing a user interface to modify the operational characteristics of dependency links in accordance with one embodiment of the present invention. Computing device 600 includes a graphical user interface 602 that in this example is displaying services 604 and intervening dependency links. Computing device 600 can also include one or more central processing units ("CPUs"), whether distributed or otherwise, to execute program instructions, for example, in response to input provided by a user via a user input device 614. A bus and/or network 620 facilitate communications among user interface 602, CPU 612, user input 614, and memory 620. Note that while memory 620 is depicted as a unitary memory, the one or more depicted modules can be distributed throughout an SOA-based networked computer system. In this example, memory 620 includes any arbitrary operating system ("OS") 622, applications programs 624, a message observer module 630, a dependency calculator 640 and a user interface module 650. As shown, message observer module 630 includes executable instructions to implement a message characterizer ("MC") module 632. Dependency calculator 640 includes executable instructions to store and fetch characterization values ("Char Values") 642, source-destination values ("S-D IDs") 644, and service identifiers ("Serv IDs") 646. User interface module 650 operates in response to input at user input device 614. For example, user interface module 650 generates symbols describing the number of messages, for example, that are passing through the dependency links that relate to a specific transaction in view of the total number of messages passing through those services 604 for other transactions. As an example, symbol 606*a* indicates that there are 57 messages passing between the two services related to a transaction of interest, whereas there are 212 total messages passing via that same dependency link. Symbols 606*b* and 606*c* represent similar properties of corresponding dependency links.

So when managing operation of the SOA-based networked computer system, a graphical user interface can accept a request to determine a first subset of services coupled via dependency links that are used to perform a first transaction. Then, computing system 600 can display for the first transaction a first service ("S1") 604 coupled via at least one dependency link to a second service ("S3") 604. User input 614 can accept a request to modify a property of a dependency link to modify behavior of the first transaction, thereby facilitating the management of the operation of the SOA-based computer network. For instance, the request to modify the property can include executable instructions to modify a number of messages flowing between the first service and the second service. An example of a case when the number of messages flowing between services increases is when a manager implements a new transaction and then performs an impact analysis to determine the increase in messages due the increased usage of those services. Audit logging, use of signed messages, fault analysis and other similar activities can influence the operation of the SOA-based computer network. Either software processes or hardware processes, or both, can govern the various above-described methods of characterizing messages and discovering dependencies.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, C#, or any other programming language and/or development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable medium forming a computer storage product, including executable instructions to identify underlying services of transactions in a service-oriented architecture ("SOA")-based computer network, the computer readable medium comprising executable instructions to:
characterize messages communicating among services by applying a function to each message to transform each message into a characterization value having a fixed length indicative of the contents of each message, thereby forming characterization values, each service receiving and/or transmitting messages associated with a plurality of transactions that are unspecified by the associated messages, each transaction being supported by a subset of said services;
determine if the messages are inbound messages or outbound messages;
based on the messages being an inbound message or an outbound message, associate each of the messages with one of the said services;
based on the association of two or more messages with the same service, link the two or messages to form a context for the two or more messages;
enhance the characterization values for each of the two or more messages by incorporating the context with the characterization values;
store said enhanced characterization values external to said messages without altering said messages;
compare enhanced characterization values to determine dependencies within a subset of said services; and
determine at least one of the plurality of transactions as supported by the subset of said services according to the determined dependencies.

2. The non-transitory computer readable medium of claim 1 further comprising executable instructions to adjust a size associated with said fixed length to maintain a number of unique characterization values to attribute to a number of subsets of said messages.

3. The non-transitory computer readable medium of claim 1 wherein said function is a hash function.

4. The non-transitory computer readable medium of claim 1 further comprising executable instructions to graphically represent a dependency link on a display of a graphical user interface ("GUI").

5. The non-transitory computer readable medium of claim 4 further comprising executable instructions to form a chain of dependency links.

6. A system to identify underlying services of transactions in a service-oriented architecture ("SOA")-based computer network, the apparatus comprising:
a network of computing devices implementing a plurality of services exchanging messages to perform transactions that are unspecified by the messages;
a message observer module configured to compute characterization values for messages either entering each service or exiting each service, or both by independently condensing and comparing said messages amongst themselves, for a subset of services of said plurality of services, wherein said message observer module comprises a programmable hash function generator configured to generate a fixed amount of bits to represent each of said characterization values, wherein said programmable hash function generator is configured to adjust said fixed amount of bits as a function of a number of total messages, determine if the messages are inbound messages or outbound messages, based on the messages being an inbound message or an outbound message, associate each of the messages with one of the said services, based on the association of two or more messages with the same service, link the two or messages to form a context for the two or more messages, enhance the characterization values for each of the two or more messages by incorporating the context with the characterization values; and
a dependency calculator module configured to receive said characterization values and to determine dependency links between services having an equivalent characterization value within said subset of services,
wherein one or more dependency links describe the cooperation of services that effectuate said transactions such that the messages can be associated with transactions according to their characterization values.

7. The system of claim 6 wherein said message observer module is further configured to provide with each of said characterization values a source-destination indicator and a service identifier.

8. The system of claim 7 wherein said dependency calculator module is configured to determine at least one of said dependency links as a dependency link between a first service and a second service, said dependency calculator module designating said first service as an originating portion of said dependency link if a first source-destination indicator identifies said first service as a source of messages having said equivalent characterization value, and designating said second service as a terminating portion of said dependency link if a second source-destination indicator identifies said second service as a destination of messages having said equivalent characterization value.

9. The system of claim 7 further comprising a user interface module configured to provide data representing said one or more dependency links for displaying said one or more dependency links on a display of a user interface.

* * * * *

UNITED STATES PATENT AND TRADEMARK OFFICE
CERTIFICATE OF CORRECTION

| | |
|---|---|
| PATENT NO. | : 8,195,789 B2 |
| APPLICATION NO. | : 11/111130 |
| DATED | : June 5, 2012 |
| INVENTOR(S) | : Carter |

It is certified that error appears in the above-identified patent and that said Letters Patent is hereby corrected as shown below:

In column 1, line 11, delete "requesters" and insert -- requestors --, therefor.

In column 3, line 26, delete "filly" and insert -- fully --, therefor.

In column 7, line 44, delete ""("S1 ")" and insert -- ("S1") --, therefor.

In column 7, line 46, delete ""("S3 ")" and insert -- ("S3") --, therefor.

In column 7, line 49, delete ""("S2 ")" and insert -- ("S2") --, therefor.

In column 9, line 40, delete ""s1, "" and insert -- "s1," --, therefor.

In column 9, line 40, delete ""3 "" and insert -- "s3" --, therefor.

In column 9, line 40, delete ""s4 "" and insert -- "s4" --, therefor.

In column 9, line 41, delete ""("2 ")" and insert -- ("2") --, therefor.

In column 9, line 41, delete ""("3 ")" and insert -- ("3") --, therefor.

In column 9, line 41, delete ""("4 ")" and insert -- ("4") --, therefor.

In column 9, line 61, delete ""("1 ")" and insert -- ("1") --, therefor.

In column 9, line 61, delete ""("3 ")" and insert -- ("3") --, therefor.

In column 9, line 62, delete ""("1 ")" and insert -- ("1") --, therefor.

In column 9, line 64, delete ""("3 ")" and insert -- ("3") --, therefor.

In column 9, line 66, delete ""("1 ")" and insert -- ("1") --, therefor.

In column 9, line 66, delete ""("2 ")" and insert -- ("2") --, therefor.

Signed and Sealed this
Twenty-eighth Day of August, 2012

David J. Kappos
*Director of the United States Patent and Trademark Office*

CERTIFICATE OF CORRECTION (continued)
U.S. Pat. No. 8,195,789 B2

In column 9, line 66, delete "("3 ")" and insert -- ("3") --, therefor.

In column 9, line 67, delete "("4 ")" and insert -- ("4") --, therefor.

In column 10, line 9, delete "("S3 ")" and insert -- ("S3") --, therefor.

In column 10, line 13, delete "("S3 ")" and insert -- ("S3") --, therefor.

In column 10, line 25, delete "("S3 ")" and insert -- ("S3") --, therefor.

In column 10, line 54, delete "("1 ")" and insert -- ("1") --, therefor.

In column 10, line 55, delete "("2 ")" and insert -- ("2") --, therefor.

In column 10, line 55, delete "("3 ")" and insert -- ("3") --, therefor.

In column 10, line 55, delete "("4 ")" and insert -- ("4") --, therefor.

In column 12, line 8, delete "("S1 ")" and insert -- ("S1") --, therefor.

In column 12, line 9, delete "("S3 ")" and insert -- ("S3") --, therefor.

In column 13, line 24, in Claim 1, after "or" insert -- more --.

In column 14, line 19, in Claim 6, after "or" insert -- more --.